April 18, 1933. N. C. PLUTINO 1,904,801

AUTOMATIC AIRPLANE AND DIRIGIBLE CONTROL APPARATUS

Filed July 26, 1932 5 Sheets-Sheet 1

Fig. 1.

Inventor
Nicola C. Plutino
By Mawhinney & Mawhinney
Attorneys.

April 18, 1933.    N. C. PLUTINO    1,904,801

AUTOMATIC AIRPLANE AND DIRIGIBLE CONTROL APPARATUS

Filed July 26, 1932    5 Sheets-Sheet 2

Inventor
Nicola C. Plutino
By Mawhinney & Mawhinney
Attorneys.

Inventor
Nicola C. Plutino
By Mawhinney & Mawhinney
Attorneys.

April 18, 1933.    N. C. PLUTINO    1,904,801
AUTOMATIC AIRPLANE AND DIRIGIBLE CONTROL APPARATUS
Filed July 26, 1932    5 Sheets-Sheet 4

Patented Apr. 18, 1933

1,904,801

UNITED STATES PATENT OFFICE

NICOLA CONZOLATO PLUTINO, OF WELLAND, ONTARIO, CANADA

AUTOMATIC AIRPLANE AND DIRIGIBLE CONTROL APPARATUS

Application filed July 26, 1932. Serial No. 624,797.

The present invention relates to air craft of both the airplane and dirigible types, and has for an object to provide an automatic control apparatus for maintaining the same in equilibrium automatically not only as to horizontal direction but also as to altitude.

Another object of the present invention is to provide an automatic control of this character which does not interfere with the manual control of the air craft but which will automatically take up the control of the craft should the manual controls fail for any reason such as by breakage or by incapacity of the pilot.

Another object of the present invention is to provide an automatic controlling apparatus which may be operated by a compass and an altimeter, and which at the same time automatically controls the stabilization or equilibrium of the craft by a novel construction of plumb relay.

The invention further aims to provide a novel construction of master relay which embodies the features of a plumb and which at the same time cooperates with the various controls and devices for operating the same to bank the airplane proportionately to turns and to the various movements required to maintain it in a state of equilibrium and to its prescribed course.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
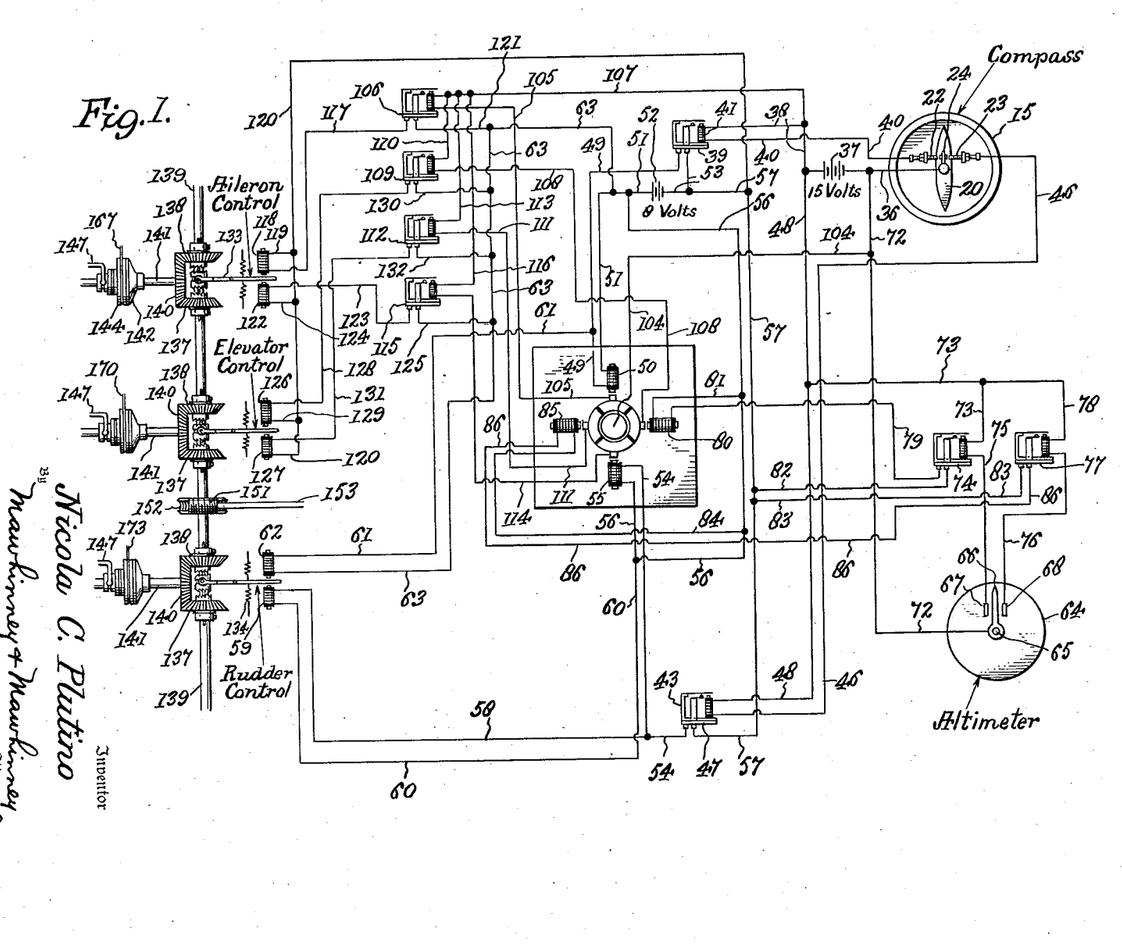
Figure 1 is a diagrammatical view of the electrical circuits and the relative positions of the various devices therein according to the present invention.
Figure 2:
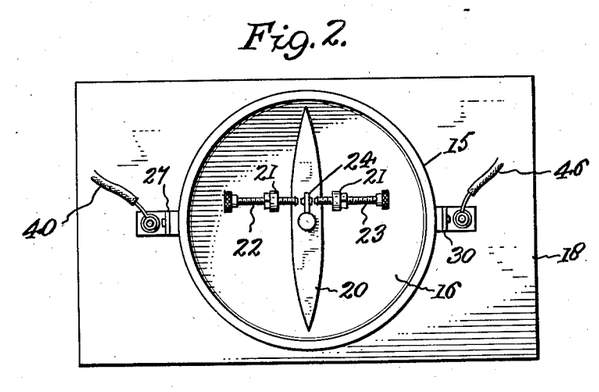
Figure 2 is a detail enlarged top plan view of one form of compass which may be used.

Referring now to the drawings the apparatus is under control of several devices, one of which is shown in Figures 1 to 4 in the form of a compass 15. The compass 15 is shown in the present instance as comprising a circular casing which may be of insulating material and which is provided with an intermediate wall or partition 16 disposed intermediate the upper and lower ends of the casing 15 and from which a hollow sleeve or bushing 17 extends downwardly through the casing 15 and through a suitable base 18. The base 18 is provided with a boss or bearing part which engages in the lower end of the casing 15 for centering the same and holding it to the base. A pointed pin 19 is carried in the sleeve 17 and projects above the same and above the partition 15 to support a compass needle 20 thereon which is adapted to operate in the usual manner. The pin 19 is fixed to the partition 16 so that by turning the pin the casing 15 may be rotated. The partition 16 also carries a pair of spaced apart upstanding posts 21 through which are adjustably secured opposed contact screws or members 22 and 23, the posts 21 being offset from one side of the pin 19, as shown in Figure 2 and the contacts 22 and 23 being directed toward each other and spaced apart at opposite sides of the needle 20.

The needle 20 is provided with a raised lug 24 which carries contact points at opposite sides so that the lug 24 itself constitutes the movable contact which lies between the contacts 22 and 23. Deviation of the needle 20 in opposite directions closes the contact 24 with the contact 22 and with the contact 23. The post 21 which carries a contact 22 is connected to a conductor strip 25 which may be embedded in the partition 16 and which extends to the exterior surface of the casing 15 and at such point is secured to an upper contact ring 26 embedded in the outer wall of the casing and adapted for engagement by a contact brush 27 suitably mounted upon the base 18.

In a similar manner, the opposite post 21 which carries the contact 23 is connected to a conductor strip 28 which may be disposed within the partition 16 and which extends to the outer side of the casing 15 and is there connected to a lower contact ring 29 embedded in the outer surface of the casing and engaged by a contact brush 30. The brush 30 is suitably mounted upon the base 18 as clearly shown in Figure 4.

Figure 3:
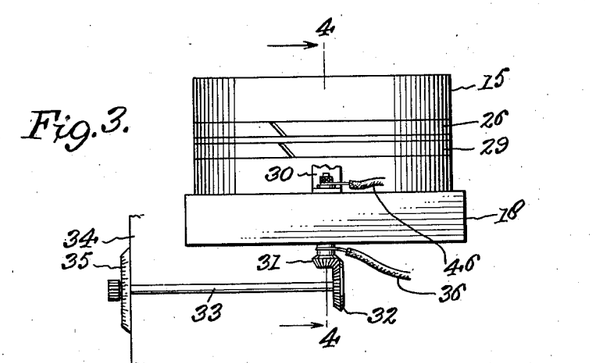
Figure 3 is a side elevation of the same.
Figure 4:
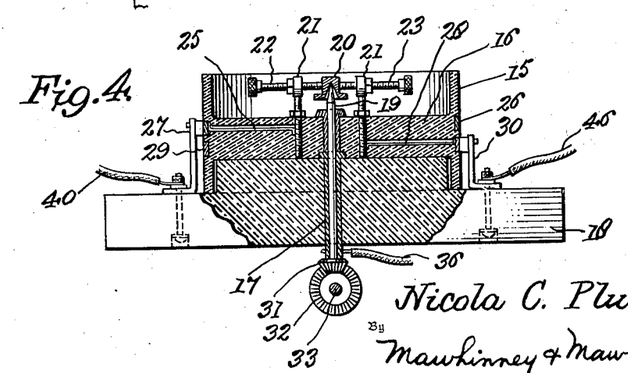
Figure 4 is a vertical central section through the compass.

The lower end of the hollow pin 19 carries a bevel pinion 31 which meshes with a bevel gear 32 carried upon a shaft 33 which extends to the exterior of the compass housing or support 34, as shown in Figure 3 and is there provided with a dial and thumb nut 35 by means of which the shaft 33 may be adjusted so as to turn the casing 15 with the contacts 22 and 23 into the desired relation with respect to any readings which the compass may have.

Thus, while the needle 20 is normally maintained in a predetermined direction by magnetic attraction, the casing 15 with its contacts may be adjusted to the course of the air craft and thus the desired closing of circuits through the contacts 22, 23 and 24 obtained.

With reference now to Figure 1 in particular, the needle 20 of the compass 15 is grounded through the shaft 17 and a wire 36 to a battery 37 which may be of relatively high voltage and which in turn is connected by a wire 38 to the magnet of a relay 39. The magnet of the relay 39 is in turn connected by a wire 40 to the fixed contact 22 of the compass.

Figures 8, 9:
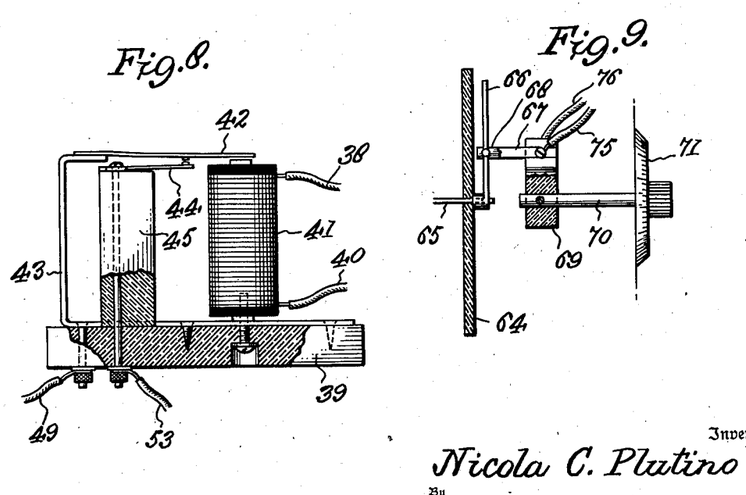
Figure 8 is a detail enlarged side elevation of one of the independent relays used.
Figure 9 is a fragmentary enlarged section taken through parts of the altimeter, showing the means of adjustment.

The relay 39, as best shown in Figure 8, may comprise a base plate upon which a magnet 41 is mounted, and the upper end of the magnet is disposed beneath an armature 42 supported upon a bracket arm 43 which is carried by the base and which has a contact adapted to engage an underlying contact on an arm 44 which is suitably mounted upon a post 45. The relay 39 comprises one of the independent or local circuit relays used in the apparatus.

Referring again to Figure 1, the fixed contact 23 of the compass 15 is connected to a wire 46 which leads to the magnet of a second relay 47, of similar construction to the relay 39, and the magnet of the relay 47 is in turn connected by a wire 48 to the remote side of the battery 37.

The bracket 43 of the relay 39 is connected by a wire 49 to a magnet 50 of a master plumb relay. The magnet 50 is in turn connected by a wire 51 to a battery 52 of relatively low voltage, and the battery 52 is in turn connected by a wire 53 to the arm 44 of the relay 39.

The bracket 43 of the relay 47 is connected by a wire 54 to one side of a second magnet 55 of the master relay which is diametrically opposed on the relay from the magnet 50. The magnet 55 in turn is connected by a wire 56 to the wire 51 which leads to the battery 52, and the wire 53 of the battery is branched by a wire 57 to the arm 44 of the relay 47.

The relay 47 also controls a branch circuit which comprises a wire 58 which leads from the wire 54 to one of the rudder control magnets 59, and a wire 60 extends from the magnet 59 to the wire 56 so as to include the battery 52 in circuit with the relay 47 and the rudder control magnet 59.

The first relay 39 also controls a branch circuit which comprises a wire 61 which is branched from the wire 49 and which leads to the opposite rudder control magnet 62, and from the latter a wire 63 is carried to the wire 51 which leads to the battery 52 and is connected to the relay 39.

The apparatus may also be controlled by the operation of the altimeter, and this device may be of any suitable construction and is shown as comprising a body portion 64 having a shaft 65, as shown particularly in Figure 9. The shaft 65 carries a pointer 66 having operation between a pair of contacts 67 and 68. These contacts may be mounted on the opposite sides of an insulating block 69 supported on a spindle 70 having a thumb dial 71 by means of which the pair of contacts 67 and 68 may be adjusted with reference to the body portion 64 of the altimeter.

Referring to Figure 1, the shaft 65 of the altimeter is connected by a wire 72 which leads to the wire 36 connected to the battery 37, and the wire 48 which extends from the opposite side of the battery 37 is connected by a branch wire 73 to the magnet of a relay 74, of the same construction as that of the relay 39.

The magnet of the relay 74 in turn is connected by a wire 75 to the contact 67 of the altimeter. The opposed contact 68 of the altimeter is connected by a wire 76 to the magnet of another relay 77, constructed similarly to the relay 39, and the magnet of the relay 77 is connected by a wire 78 to the wire 73.

The relay 74 has its brackets 43 connected to a wire 79 which leads to a magnet 80 of the master relay, and the magnet 80 has a wire 81 which is connected to the wire 56 which leads to the battery 52. The circuit from the battery 52 includes wire 53, wire 57 and a wire 82 which is branched from the wire 57 to the contact arm 44 of the relay 74.

The other relay 77 which is under control of the altimeter, has its post 43 connected to a wire 83 which is branched into wire 57 and the latter leads to the battery 52 which is in circuit with wire 56, and a wire 84 is branched from the wire 56 and leads to a magnet 85 of the master relay. A wire 86 leads from the magnet 85 back to the contact arm 44 of the relay 77.

Figure 5:
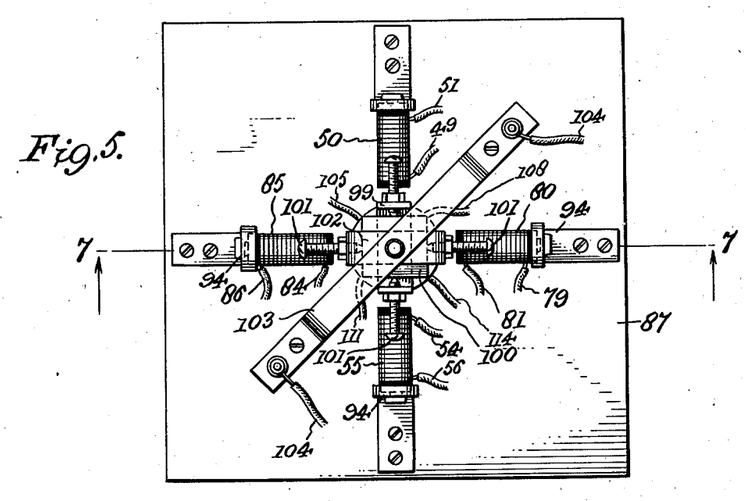
Figure 5 is a detail top plan view of the master relay employed.
Figure 6:
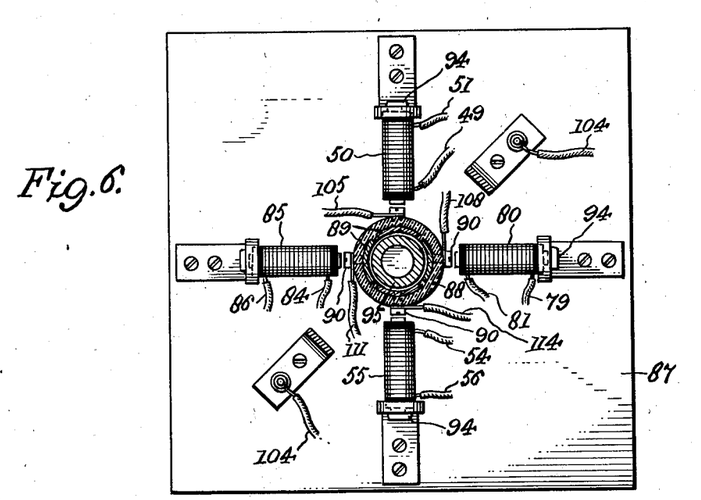
Figure 6 is a horizontal section taken through the same on the line 6—6 of Figure 7.
Figure 7:
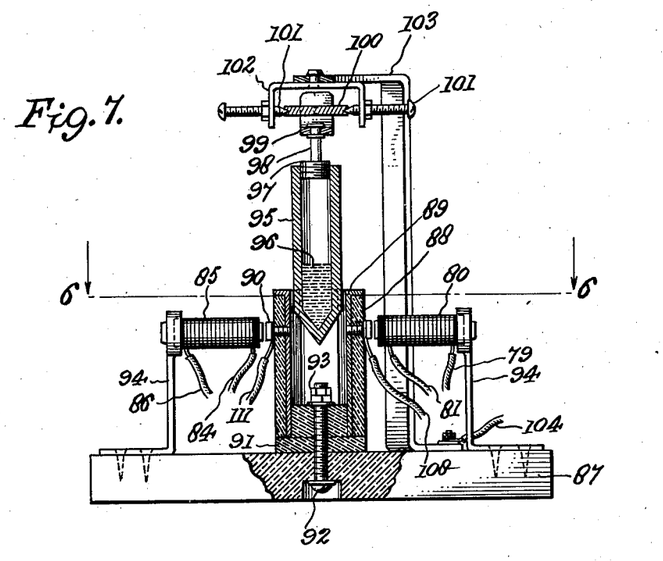
Figure 7 is a vertical section taken on the line 7—7 of Figure 5 of the master relay.

As best shown in Figures 5, 6 and 7, the master relay comprises a base 87 upon the central portion of which is mounted an upwardly extending commutator cylinder 88 which comprises a body of insulating material having counter-sunk in its inner wall spaced contact strips 89 which are disposed in opposed pairs and which are arranged in line with the respective magnets 50, 55, 80 and 85. The contact strips 89 may be held within the commutator cylinder 88 by screws 90 which may be so located as to provide armatures arranged in axial alignment with the respective magnets, and these screws 90 may be also utilized, if desired, as providing binding posts or connectors for wires which are subsequently described.

The cylinder 88 is supported upon a yieldable block 91 of rubber, or the like, which may extend part way into the lower end of the cylinder and which is of suitable thickness at its lower end to provide a cushion support and to admit of the universal tilting or rocking of the cylinder under influence of the various magnets which are disposed radially in spaced relation thereabout. A bolt 92 may be fitted upwardly through the base 87, through the block 91 and provided with lock nuts 93, or the like, on its upper end adapted to not only hold the block from shifting, but to also compress the block 91 and bind it in the cylinder 88. It will be noted from Figure 7, particularly, that the rocking movement of the cylinder 88 need be but slight to accomplish the results desired. The radially disposed magnets are mounted on brackets 94 of any suitable construction carried by the base 87, and the cylinder 88 is open at its upper end and receives in suspended relation thereover a contact plumb 95 which may be hollow to contain a body of mercury 96, or may otherwise be weighted so as to urge the contact plumb 85 into a normal vertical position. The plug 97 is detachably screwed into the upper end of the plumb 95 to close it.

The plug 97 has an upwardly extending stem 98 which is mounted in a yoke 99 having upstanding end portions pivotally connected to a disc 100, and the latter is pivotally mounted upon removable pivot pins 101 which are disposed axially at right angles to the pivoting of the yoke 99 and which are carried in a U-bracket 102 supported upon an overhanging arm 103 which rises from the base 87. The yoke 99 and the disc 100 thus comprise the universal joint which permits the contact plumb 95 to swing in all directions and to thus move eccentrically to the cylinder 88 so that the lower end of the plumb 95 may come into contact with the strips 89 either by the swinging of the plumb 95 or the deflection or tilting of the cylinder 88.

Referring now to Figure 1, it will be noted that the overhanging arm, which comprises the plumb contact support, is connected by a wire 104 to the wire 72 which leads to the battery 37 and this wire thus constitutes a ground to the battery 37 for the various circuits which are completed through the plumb contact 95 and the cylinder 88.

The cylinder contact 89, which is disposed in line with the magnet 50, has a wire 105 which leads to the magnet of an independent relay 106, and from the magnet of the relay 106 and wire 107 is carried to the wire 38 connected to the battery 37.

The contact 89 of the cylinder 88 which registers with the magnet 80 is connected by a wire 108 with the magnet of another independent relay 109 and which in turn is connected by a wire 110 to the battery return wire 107.

The cylinder contact strip 89 in register with the magnet 85 is connected by a wire 111 to the magnet of an independent relay 112 which is connected by a wire 113 to the common return wire 107. The fourth contact strip 89 of the cylinder is connected by a wire 114 to the magnet of an independent relay 115 and thence by wire 116 to the common battery return wire 107.

The relays 106, 109, 112 and 115 are all of the same construction as that of the relay 39 hereinbefore described and shown in detail in Figure 8.

The bracket arm 43 of the relay 106 is connected by a wire 117 to an aileron control magnet 118, and the latter is connected by a branch wire 119 to a battery wire 120 which is branched into the wire 57 which leads to the wire 53, and thence to the battery 52. The circuit is completed from the battery 52, through the wire 51, branch wire 63 and wire 121 which leads to the contact arm 44 of the relay 106. The opposite aileron control magnet 122 is connected by a wire 123 to the bracket arm 43 of the relay 115, and the magnet 122 is also connected by a branch wire 124 to the battery 120 which is in circuit with the battery 52.

The contact arm 44 of the relay 115 is connected by a wire 125 with the battery return wire 63.

The elevator control embodies opposed magnets 126 and 127. One side of the magnet 126 is connected by a wire 128 with the bracket arm of the relay 109 while the other side of the magnet 126 is connected by a wire 129 with the battery wire 120 leading to the battery 52, and the contact arm 44 of the relay 109 is connected by a wire 130 with the battery return wire 63.

The opposite elevator control magnet 127 is connected at one side directly with the battery wire 120 while its other side is connected by a wire 131 with the bracket of the relay 112. The fixed contact 44 of the relay 112 is connected by a wire 132 with the battery return wire 63. It will be noted that the magnets of the independent relays are all connected to be closed in circuit with the battery 37 which is of higher voltage than the battery 52 and which consequently is of less amperage than the battery 52, and the various magnets used for operating the different devices employed are connected to the higher amperage battery 52 which may be of a relatively low voltage. It is, of course, understood that the various circuits above described may be changed as is found desirable and necessary according to various installations, and various modifications in structural details of the various electrical and mechanical devices used.

Figures 10, 11:
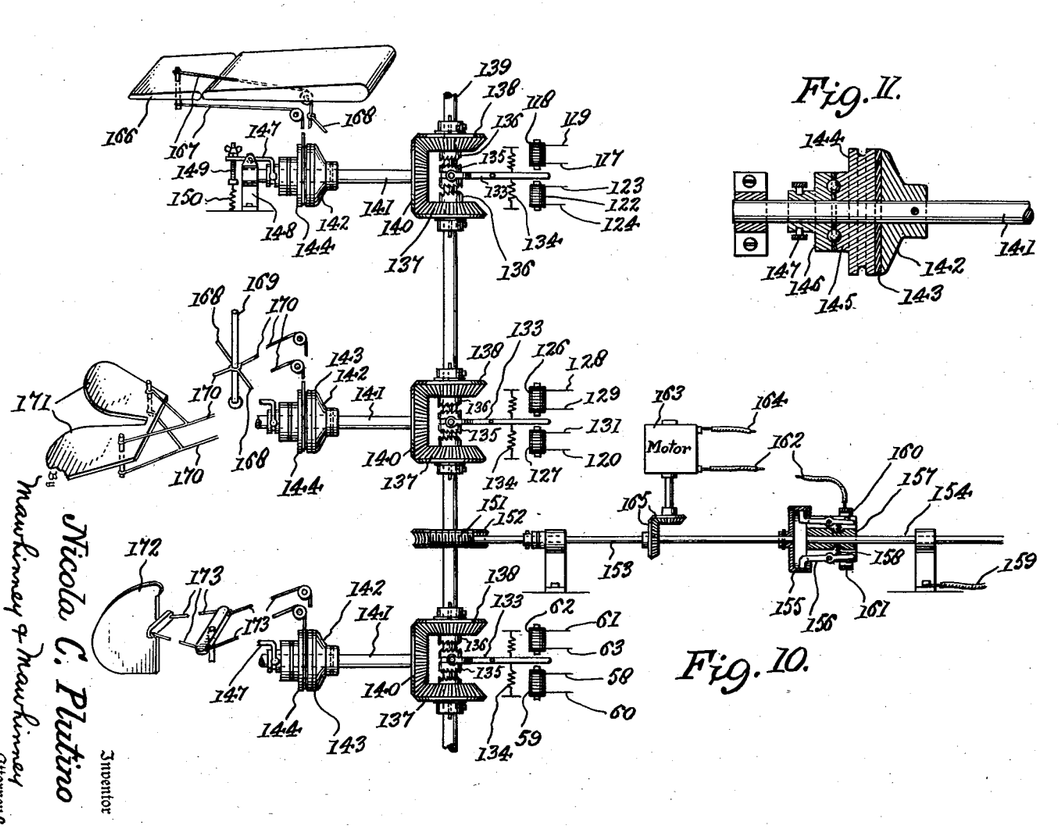
Figure 10 is a diagrammatic plan view of the airplane controls used in the apparatus.
Figure 11 is a detail enlarged longitudinal section taken through one of the slip clutches employed.

The various control magnets as shown diagrammatically in Figure 1 control the ailerons, the elevators and the rudder, or any other devices or instrumentalities which determine the conditions of direction, height and flight of an air craft or of other craft to which the apparatus is applicable. In Figures 1 and 10 the control magnets 118 and 122 are disposed at opposite sides of a shifting lever 133 which at its outer end is maintained between the magnets in a neutral or central position by opposed springs 134, or the like. The inner end of the shifting lever 133 is connected to a clutch sleeve 135 having inclined teeth at opposite ends adapted when shifted to engage the clutch portions 136 of bevel gear wheels 137 and 138 freely mounted on a drive shaft 139. The bevel wheels 137 and 138 intermesh at opposite sides with a bevel wheel 140 mounted on the shaft 141 so as to turn the shaft in either direction through the bevel gears according to the adjustment of the clutch sleeve 135. As shown in Figures 10 and 11, the shaft 141 has keyed or otherwise fixed to it a clutch element 142 against which engages a clutch facing 143 adapted to be pressed against the disc 142 by a pulley 144 slidable and rotatable upon the shaft 141.

The pulley 144 has a hub 145, and bearing against this hub is a slide collar 146 with suitable ball bearings disposed between the hub and collar, and the collar 146 is connected by a groove and pin structure to a fork 147 pivotally mounted in a bracket 148 and with a free end extending beyond the bracket. The free end of the fork 147 carries an adjusting screw 149 therethrough connected to a spring 150 suitably anchored at the side of the bracket 148 so that by adjustment of the screw 149 the fork 147 is tensioned in a direction to force the collar 146 against the pulley 144 so as to frictionally bind the pulley to the disc 142. Thus, when the shaft 141 is turned the pulley 144 is turned therewith but the pulley is capable of independent sliding movement on the shaft 141 when the various controls are operated against the resistance of the shaft 41 to turn it.

The shaft 139 is of any suitable length and is provided with a gear set, including the bevel gears 137 and 138, for each control device, and as shown in the drawings the aileron, the elevator and the rudder control devices are each equipped with a similarly constructed gear set. The clutch sleeves 135 of the gear sets are all slidably keyed upon the shaft 137, and the teeth of the clutch elements are so disposed that they will intermesh at any time of shifting and will interlock by the direction of drive.

The shaft 139 is connected in any suitable manner, such as by a worm 151 and a worm wheel 152 to a shaft 153 which is connected to the propeller shaft 154 by a centrifugal clutch. As shown in Figure 10, the shaft 153 carries an internal clutch member 155 within which engage clutch shoes 156 having axially extending arms which are pivotally mounted intermediate their ends upon a clutch block 157 rotatable with the shaft 154. Springs 158 are interposed between the outer ends of the arms of the shoes 156 tending to normally retract the shoes within the internal clutch element 155 for releasing the shafts 153 and 154 one from the other. The shaft 154 is disposed in one side of a motor circuit by means of a wire 159 which may be from any suitable source of energy. The arms of the shoes 156 have at their outer ends contacts 160 adapted to engage the inner face of a contact ring 161 which is disposed around the inner end of the block 157 and which is connected to a wire 162 which leads to a motor 163 which in turn is connected by a wire 164 to the source of current. The motor 163 is connected through gears 165 with the shaft 153 so that when the speed of the shafts 153 and 154 decelerate to a point wherein the springs 158 act against centrifugal force, the clutch shoes 156 are moved inwardly and the contacts 160 engage the ring 161 and complete the circuit through the motor 163.

Thus, as the shaft 153 is disconnected from the propeller shaft 154, the motor 163 is closed in a circuit and takes up the operation or turning of the shaft 153. With this apparatus the shaft 139 is continuously driven so as to be in condition to take up the operation of any of the controls which are automatically connected to the shaft, and to operate those controls in either direction according to the conditions required.

It will be noted that there is a pulley 144 with its adjacent clutch parts for each control device, and these pulleys may be connected to the various devices in any suitable manner. In Figure 10, there is shown diagrammatically one possible arrangement. In the upper part of Figure 10 an aileron 166 is shown as connected to the opposite ends of a cable 167 which is carried over the adjacent pulley 144. The turning of the pulley 144 in one direction raises the aileron 166, and in the opposite directions lowers the same. One end of the cable 167, forwardly of the aileron may be connected by a branch cable 168 to the control stick 169 of the airplane, the cable 168 being carried across the control stick and connected to the opposite aileron 166 so as to effect simultaneous operation of the ailerons to affect the desired stabilization or balancing of the air craft against lateral rolling, and to control banking at turns and the like.

The control stick 169 is also connected in a cable 170 which has one end attached to the elevator 171 and its other end connected to a spaced point, such as to the under side of the elevator 171. The cable 170 is looped forwardly and downwardly about the adjacent pulley 144 so as to operate the cable and the elevator by turning the pulley in either direction.

The vertical rudder is shown at the bottom of Figure 10 at 172 and is connected to the rear ends of a control cable 173 which is carried forwardly and about the adjacent clutch pulley 144.

When the apparatus is installed upon an airplane, as shown in Figure 1, it may be operated as follows:

The compass 15 is set for the desired course and after the airplane has been manually controlled to take off and ascend to a desired height, and manually placed in the general direction of the course, the manual controls may be released either by merely not operating them so that the clutch portions will cause their automatic operation in actuating the various controls or by the use of any suitable means or constructions to free the control stick and other devices which may be used.

On the other hand, when the airplane is under manual control the resistance to operation of the various levers may be reduced by relaxing the spring pressure on the forks 147 so that the clutch collars 146 will free the pulleys 144 and the latter may turn with practically no resistance freely upon the shafts 141.

The compass being set, should the needle be deflected toward the left, it will close the contact 22 in circuit with the battery 37 and through the magnet of the relay 39. This closes the contacts 42 and 44 of the relay 39 and thus a circuit is closed through the wire 49, magnet 50 of the master relay, wire 51 and through battery 52, back through wire 53 to the relay. The magnet 50 is thus energized and it attracts or tilts toward it the cylinder 88 so that the plumb contact 95, suspended in the upper end of the cylinder, is brought into engagement with the opposite contact strip 89 and a circuit is closed through the wire 114, magnet of relay 115, wire 116, wire 107, wire 38, battery 37, wire 72, wire 104 to overhanging arm 103 and through contact plumb 95. The relay 115 is thus operated to close a circuit through wire 123, aileron control magnet 122, wire 124, wire 120, wire 57, wire 53, battery 52, wire 51, wire 63 and wire 125 to the relay 115. The magnet 122 thus energized, swings the shifting lever 133 in a direction to engage the clutch sleeve 135 with the bevel gear 138. This drives the shaft 141 in one direction to raise one aileron 166 and depress the opposite one to thus bank the airplane for a turn. At the same time, the rudder 172 is actuated by the rudder control magnet 62, the relay 39 closing the branch circuit of the magnet as follows:

From relay 39 through wire 49 to wire 61 and magnet, return wire 63 to wire 51, battery 52 back to the relay 39 through wire 53. Of course, the cable connections to the various control members from the ailerons, the elevator and the rudder, are so connected as to effect the desired cooperation of banking for a turn in the desired direction and at the same time moving the rudder into position about or into the turn.

In a like manner, when the compass needle 20 swings in an opposite direction and makes contact with the fixed contact 23, a circuit is closed through the magnet of the relay 47 which not only closes a circuit through the rudder control magnet 59, but also through the magnet 55 of the master relay. In this instance, cylinder 88 is tilted in an opposite direction so as to close the plumb contact 95 in circuit with the opposite strip 89 and its wire 105 so that the relay 106 is operated to close the circuit through the opposite aileron control magnet 118. Thus the rudder being turned in the opposite direction the aileron control tilts the ailerons so as to bank in the opposite direction.

As to regulating the general height or altitude of the airplane, the altimeter is set and adjusted and the needle 66 thereof makes contact with the pins 67 and 68 to actuate either the relay 74 or the relay 77.

These relays control the circuits through the magnets 80 and 85 of the master relay. It is apparent that the cylinder 88 may be tilted back and forth between these magnets as they are alternately closed in the circuit to bring the cylinder 88 into contact at its front and rear sides with the contact plumb 95. In this case contact plumb 95 closes the circuit from the wire 104 and battery 37 through either the wire 111 which leads to the relay 112, or through the wire 108 which leads to the relay 109. These relays 109 and 112 independently control the elevator control magnets 126 and 127 so that the elevator 171 is operated to direct the current either upwardly or downwardly.

It is also apparent that the master relay with its contact plumb 95 will operate independently to automatically stabilize the airplane not only against endwise tilting but against lateral rolling because the plumb 95, being gravity actuated will actually engage or contact with the lateral or front and rear contact strips 89 within the cylinder 88 and will of itself thus close the various circuits of the control magnets without reference to the influence of the compass and altimeter circuits. It is evident that the contact plumb, being operable not only by gravity, but also being subject to the influence of the various magnets of the master relay, the contact plumb 95 and the cylinder 88 may be simultaneously operated in various combinations, all of which tend to maintain the gravity at the desired height, to a desired cross and in a stabilized or equalized position.

The continuously operating shaft 139 may be driven through the propeller shaft 154, or through any suitable connection therewith so that the control mechanism may be mechanically actuated through the propeller or engine when the various clutches are brought into play. Should the propeller or engine stop operation, or be disabled, or be reduced in speed beyond a desired rate, the centrifugal clutch operates to free the shaft 153 from the propeller shaft 154 and connects the motor 163 in a circuit to independently drive the shaft 139. Of course, the motor 163 may be of any suitable type and when not used in circuit might be employed as a generator, or put to any other suitable use as may be found desirable.

It is obvious that various changes and modifications may be made in the details of construction and design of the above specifically described embodiment of this invention without departing from the spirit thereof, such changes and modifications being restricted only by the scope of the following claims.

What is claimed is:

1. An automatic control apparatus for an airplane and the like, comprising separate controls for the airplane, electrical devices for the controls, electrical circuits for the devices, a plumb control relay in said circuits to close the same and operate the devices by deviation of the relay out of its normal axis, a compass, an altimeter, and electrical circuits between the plumb contact relay and the compass and altimeter to operate the relay independently of its operation by deviation from its normal axis.

2. An automatic control apparatus for an airplane and the like, comprising aileron, elevator and rudder controls for the airplane, independent electrical devices for the controls, independent electrical circuits for said devices, a master plumb relay in said circuits adapted to close the same and operate the devices by deviations of the relay out of a vertical axis, a horizontal course determining compass, an altimeter, and independent opposed electrical circuits between the compass and the altimeter and the master plumb relay for actuating the same independently of and conjointly with its plumb action to operate said electrical devices.

3. An automatic control apparatus for airplanes and the like, comprising separate controls for the airplane, electrical devices for the controls, electrical circuits for the devices, selective actuating means, and a master multiple relay connected to said electrical circuits and to said actuating means for selective operation by the latter to close the respective circuits and operate the corresponding devices and controls.

4. An automatic control apparatus for airplanes and the like, comprising separate controls for the airplane, electrical devices for the controls, a relay circuit for each device including an independent relay, a master multiple relay having individual circuits each including an independent relay, and selective actuating means having independent circuits connected to the master relay for operating the latter to selectively close the relay circuits and operate the corresponding devices and controls.

5. An automatic control apparatus for airplanes and the like, comprising separate controls for the airplane, electrical devices for the controls, a relay circuit for each device including an independent relay, a master multiple relay having individual circuits each including an independent relay, and selective actuating means having independent circuits connected to the master relay for operating the latter to selectively close the relay circuits and operate the corresponding devices and controls, said master multiple relay having a plumb contact and a plurality of cooperating contacts in said individual circuits for closing the latter by deviation of the plumb contact out of its normal axis independently of and conjointly with the operation of said selective actuating means.

6. An automatic control apparatus for airplanes and the like, comprising separate controls for the airplane, electrical devices for the controls, electrical circuits for the devices, selective actuating means, and a master multiple relay connected to said electrical circuits and to said actuating means for selective operation by the latter to close the respective circuits and operate the corresponding devices and controls, said master multiple relay having a gravity actuated contact element and cooperating contact elements in said circuits for closing the same independently on the actuating means upon the endwise and lateral rolling of the airplane to operate said devices and controls.

7. An automatic control apparatus for air craft and the like, comprising independent controls for the air craft, electric devices for actuating said controls, an independent circuit for each of said devices, an independent relay in each circuit, a master multiple relay, an independent master circuit between each independent relay and said master relay, a compass having opposed contacts, a separate circuit for each contact, an independent relay in each separate circuit, and actuating circuits between each of said last named independent relays and said master relay for actuating the same to close said master circuits.

8. An automatic control apparatus for air craft and the like, comprising a plurality of controls, electric devices for said controls, a master multiple relay having a plurality of magnets, control circuits including said magnets for selectively operating the same, a movable contact member arranged in the fields of said magnets and having a plurality of separate contacts, master relay circuits including said devices and said contacts, and a common contact element grounded to said master circuits and adapted to be engaged by said contacts when the contact element is actuated by the magnet.

9. An automatic control apparatus for air craft and the like, comprising a master multiple relay having opposed pairs of magnets, a contact cylinder arranged within the group of magnets and having an independent contact strip opposite each magnet, control circuits including the magnets for individually energizing the same to move the contact member, a fixed central contact for engagement by said contact strips when the member is moved, a plurality of controls for the air craft, and electrical devices for said controls and master circuits between said devices and said contact strips and said central contact.

10. In an automatic control apparatus for air craft and the like, a master relay comprising a circular row of radially disposed magnets, a contact cylinder movably mounted within said row of magnets and having armatures in register with the magnets for deflecting the cylinder upon individual energization of the magnets, and a contact plumb suspended within the upper end of the cylinder, said cylinder having circuit contacts in its inner wall adapted to selectively engage the plumb contact upon deviation of the cylinder and the plumb contact.

11. In an automatic control apparatus for airplanes and the like, a base, a contact cylinder movably mounted at its lower end upon the base and adapted to rock thereon and having a plurality of contact strips spaced apart in its inner wall, a circular row of magnets arranged about the upper end portion of the cylinder and said cylinder having armatures thereon registering with the magnets for swinging the cylinder upon selective energization of the magnets, and a central contact projecting downwardly into the cylinder for engagement with the contacts within the cylinder when the latter is tilted.

12. In an automatic control apparatus for air craft and the like, a master multiple relay comprising a support and vertically disposed cylinder above the support, a yieldable mounting between the cylinder and the support admitting the tilting of the cylinder in all directions, a circular row of magnets radially disposed about the cylinder, armatures mounted on the outer side of the cylinder in register with the magnets, a plurality of spaced apart contact strips arranged about the inner wall of the cylinder, a bracket carried by the support and overhanging the cylinder, a contact plumb suspended in the bracket and projecting into the upper end of the cylinder for engagement with said contacts when the cylinder is deflected, said contact plumb adapted to swing out of its normal axis upon the tilting of the support.

13. In an automatic control apparatus for air craft and the like, a master relay comprising a base, a vertical cylinder above the base, a yieldable block carried by the base and supporting said cylinder to admit of the yielding deflection of the upper end of the cylinder, a plurality of spaced apart contact strips mounted in the inner wall of the cylinder, radially and oppositely disposed pairs of magnets carried by the base about the cylinder, armatures mounted on the cylinder in line with the magnets for tilting the cylinder by the individual energization of the magnets, an overhanging bracket carried by the base, a universal support carried by the bracket, and a contact plumb mounted on the universal support and projecting down into the cylinder and being of less diameter than the inner wall of the cylinder for normally spacing the contact plumb from said strip contacts, said magnets adapted to tilt said cylinder to bring said contact plumb into engagement with the strip contacts and the cylinder, said contact plumb adapted to deviate from its normal axis upon the tilting of said base to close said contacts.

14. In an automatic control apparatus for air craft and the like, a plurality of controls for the air craft, electrical devices for said controls, a master relay, circuits between the master relay and said devices, a compass, an altimeter, independent circuits between said compass and altimeter and said master relay for selectively actuating the latter by deviations in the compass and the altimeter to close the circuits through said devices and operate the controls.

15. In an automatic control apparatus for airplanes and the like, a master relay, a plurality of electrical devices connected in circuit with the master relay, controls for the airplane actuated by said devices, a compass having opposed contact points, an altimeter having opposed contact points, independent circuits between the contact points of the compass and the altimeter and said master relay for selectively actuating the same to close the circuits through said electrical devices.

16. In an automatic control apparatus for air craft and the like, a continuously operating shaft, a plurality of shiftable clutch elements mounted on the shaft to turn therewith, reversely operating gear sets operatively disposed with respect to each shiftable clutch element, independent connections from said gear sets for the aileron, elevator and rudder devices of the air craft, electrical devices for said shiftable clutch elements, a master relay having circuits including said devices, a compass, an altimeter, and circuits between the compass and altimeter and said master relay for selectively operating the same to actuate the said devices.

17. In an automatic control apparatus for air craft, a shaft, a drive shaft connected to said first shaft, a propeller shaft, a centrifugal clutch element connecting said drive and propeller shafts for operating said first shaft by the propeller shaft above and predetermining the speed of revolution of the propeller shaft, a motor having an operating circuit, contacts in said circuit connected to said centrifugal clutch and adapted to be closed when the propeller shaft is released from the drive shaft, a connection between the motor and the drive shaft for operating the latter from the motor when the motor is closed and the propeller shaft is disconnected from the drive shaft, a plurality of air craft controls connected to said first shaft, electrical devices for actuating said controls, and automatic direction and altitude controlled circuit closing means for selectively actuating said devices.

In testimony whereof I affix my signature.

NICOLA CONZOLATO PLUTINO.